March 31, 1942.    C. G. PUCHY    2,278,139
MOTOR
Filed Nov. 13, 1939    2 Sheets-Sheet 1

INVENTOR
Clarence G. Puchy
BY
Harry S. Dumarsh
ATTORNEY

March 31, 1942. C. G. PUCHY 2,278,139
MOTOR
Filed Nov. 13, 1939 2 Sheets-Sheet 2

INVENTOR
Clarence G. Puchy
BY Harry S. Demasse
ATTORNEY

Patented Mar. 31, 1942

2,278,139

UNITED STATES PATENT OFFICE 2,278,139

MOTOR

Clarence G. Puchy, North Canton, Ohio, assignor to The Hoover Company, North Canton, Ohio Application November 13, 1939, Serial No. 303,961

5 Claims. (Cl. 171—252)

This invention relates to motors and more particularly to a field assembly for a fractional horse power induction motor of the closed yoke salient pole type especially adapted for use in an absorption refrigerating apparatus of the pressure equalized type for driving a circulating unit for circulating the mediums in the apparatus in which the motor rotor and circulator are positioned interiorly of the apparatus and the field assembly are positioned exteriorly thereof.

In refrigerating apparatus of the type referred to, the pressures are substantially equalized throughout all parts of the apparatus and therefore only a very small motor is required since there is little pressure head to overcome in circulating the mediums in the apparatus. In such apparatus a thin shell separates the rotor from the field assembly and it is desirable that the field assembly be accurately made to fit over this shell tightly and thus add support to the shell against the internal pressures.

In closed yoke salient pole field assemblies of small size it is very difficult to pre-wind the coils and yet assemble them with the stack laminations. Hand winding of the coils after the assembly of the stack laminations is very costly and therefore prohibitive. Machine winding of the coils is impossible due to the small size of the field stack.

In small motors of the type here involved, when the coils are prewound, it is usually necessary to make the pole pieces separate from the yoke laminations so that the coils can be assembled thereover before the pole pieces are assembled with the yoke laminations. Due to the small size of the motor here under consideration, the joint between the separate pole pieces and the yoke must be so made as not to impair the magnetic path for the lines of force.

Since the motor here involved is intended to be assembled over the thin shell of a hermetically sealed rotor, subject to high internal pressures, the yoke must be made as strong as possible consistent with forming a joint between the separate pole pieces and the yoke.

In the manufacture of small motors, it is desirable to reduce the number of stampings necessary since a large number of stampings increase the die costs and also the number of operations, and parts to be handled in assembling the laminations.

It is therefore one object of this invention to provide a field assembly for the above type motors which is easy to manufacture and efficient in operation.

It is also another object of this invention to provide a small field assembly for a closed yoke salient pole motor in which the coils can be prewound and thereafter assembled to the stack laminations.

It is also another object of this invention to provide a salient pole, closed yoke motor of small size in which the pole pieces are made separately from the yoke laminations so that prewound coils can be assembled therewith in which the joints between the pole pieces and yoke are so made as not to impair the magnetic path for the lines of force.

It is another object of this invention to provide a small closed yoke salient pole field assembly having separate pole pieces in which the joints between the pole pieces and the yoke are so made as not to materially decrease the strength of the yoke.

It is another object of this invention to provide a field assembly with a minimum number of stampings.

Other objects and advantages of this invention will become apparent as the description proceeds when taken in connection with the accompanying drawings, in which.

Figure 1:
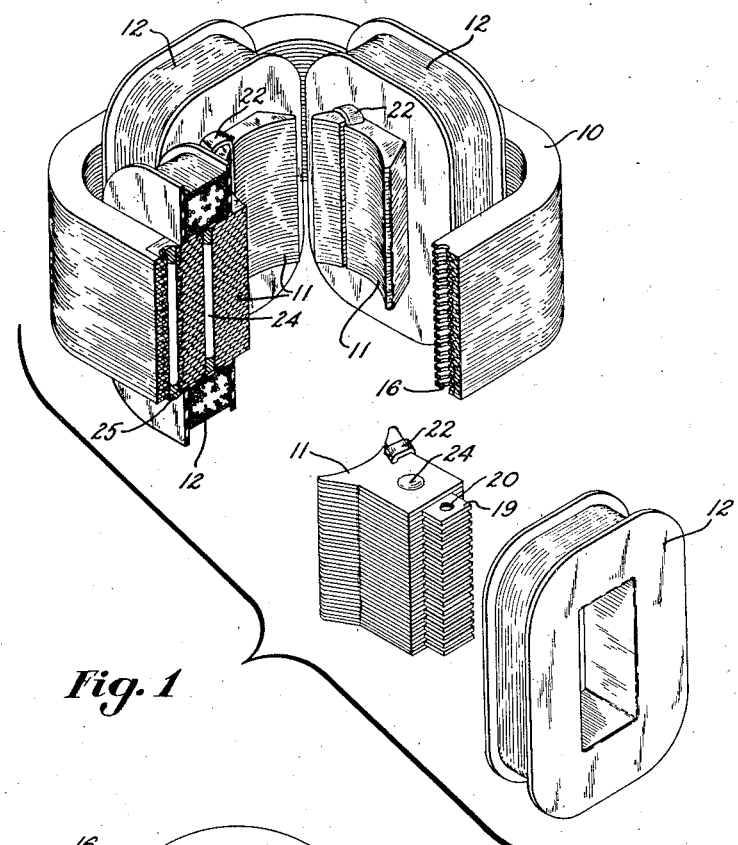
Figure 1 is a perspective view of the field assembly according to the present invention partly broken away to show the joint between the pole pieces and the yoke and also depicting how the coils are assembled with the pole pieces.
Figure 2:
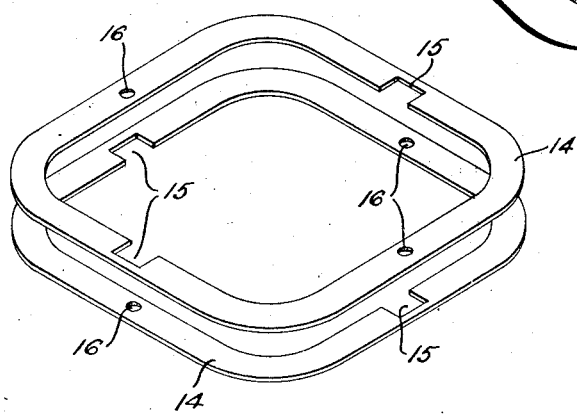
Figure 2 is a view showing the yoke stampings and depicting how two adjacent stampings are arranged prior to assembly.
Figure 3:
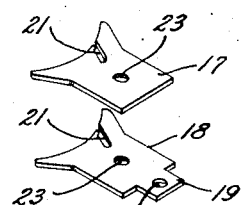
Figure 3 is a view showing the pole piece stampings and depicting how two adjacent stampings are arranged prior to assembly.

Referring to Figures 1, 2 and 3 of the drawings, numeral 10 represents a closed yoke assembly, 11 represents four separate pole piece assemblies and 12 represents four prewound field coils.

The yoke assembly is made up of a plurality of duplicate stampings 14 of closed four-sided formation having notches 15 cut in their interior periphery at two opposite sides, and in aperture 16 in the other two opposed sides.

The pole piece assemblies comprise two dissimilar stampings 17 and 18. The stamping 18 has a portion or lug 19 extending beyond the outlines of the other stamping 17 with an aperture 20 therein. Both stampings have slots 21 to receive a shading coil 22 after the stampings are assembled. Each of the stampings also have apertures 23 to receive a pin 24 for holding the stampings together prior to assembly with the yoke 10.

The stampings 17 and 18 are stacked alternately with each other as shown in Figure 3 until a stack of sufficient height is obtained, and the stampings secured together by pin 24 as by riveting. The shading coils 22 are then assembled in the slots 21. Two of the pole pieces are made with the stamping 18 at the bottom and the other two with the stamping 17 at the bottom.

The stampings 14 are then stacked one above the other to form the entire assembly with the notches of one stamping rotated 90° from those of the next adjacent stamping as shown in Figure 2 until a stack of sufficient height is obtained.

The coils 12 are then positioned over the pole pieces 11 and assembled with the yoke stack 10 with the lugs 19 interfitting with the notches 15. The pole pieces having the stamping 18 at the bottom will be assembled so as to be positioned at the sides of the yoke having notch 15 in the bottom stamping and those having the stamping 17 at the bottom will be positioned at that side having the notch 15 in the second stamping.

The whole assembly may then be positioned in a suitable die or jig and the pole pieces 11 pressed outwardly as by a burnishing tool so as to force the lugs 19 tightly into the notches 15 after which the whole assembly is secured together by pins 25. These pins may be riveted over at the ends or if it is desired to easily remove the pole pieces later, they can be secured by bolts. It will be noted that the pins 25 secure the pole pieces to the yoke as well as to secure the yoke stampings together.

This forms a closed yoke salient pole field assembly having four separate pole pieces and four prewound coils in which only three stampings are necessary.

Figure 4:
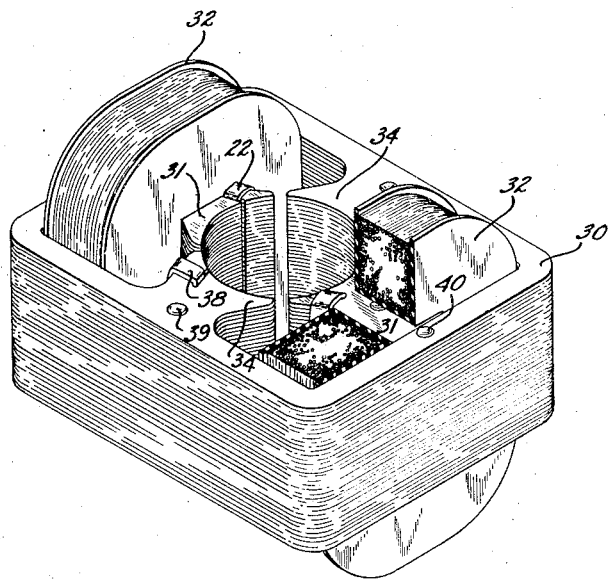
Figure 4 shows a modified form of the invention.

In Figure 4 a modified form of field assembly is shown. 30 is the yoke assembly; 31 two separate pole pieces, and 32 two prewound coils. The separate pole pieces are identical with that of Figure 1 except that only two are required. In this case, one is made with the stamping 18 at the bottom and the other with the stamping 17 at the bottom.

The yoke 30 is made up of a plurality of identical stampings 33 of rectangular formation having two pole extensions 34 stamped integrally therewith on opposite sides. Each stamping has a single notch 35 cut in its inner periphery at one end and an aperture 36 at the opposite end. Slots 37 are cut in the pole extensions 34 to receive shading coils 38 after the yoke is assembled.

Figure 5:
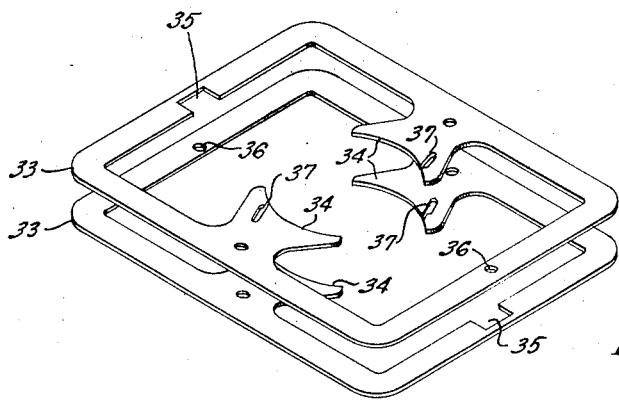
Figure 5 shows the yoke stampings of Figure 4 depicting how two adjacent stampings are arranged prior to assembly.

The pole pieces 31 are assembled as in the modification of Figure 1 and the coils 32 assembled therewith in the same way. Stampings 33 are then assembled with the notch 35 of one stamping at one end and that of the next adjacent at the opposite end, as shown in Figure 5, until a stack of sufficient height is secured. The stampings may then be secured together by pins 39, as by riveting and the shading coils 38 then positioned in the slots 37.

The pole pieces 31 are then assembled with the yoke 30, with the lugs 19 interfitting the notches 35, the whole positioned in a suitable jig, as in the modification of Figure 1, and the pole pieces forced outwardly as before. Pole pieces 31 may then be secured to the yoke 30 by pin 40.

This provides a closed yoke salient pole motor having four poles and two prewound coils.

The fact that the notches 15 and 35 do not extend to the edge of the stampings 14 and 33 assures that the magnetic path between the pole pieces and the yoke will not be materially impaired and at the same time provide a high strength yoke so that the yoke will be capable of supporting a thin shell against internal pressure.

The burnishing operation above referred to, provides a simple method for making the tight joints between the pole pieces and the yoke, and at the same time performs a forming operation on the pole faces so that the diameter between opposite pole faces can be determined with precision. This will assure that the field assembly will fit the shell over which it is to be pressed.

As can be seen, both modifications shown and described provide a field assembly in which only three stampings are necessary, in which the coils can be prewound and in which the joint between the pole pieces and the yoke do not weaken the yoke materially and do not materially impair the magnetic path between the yoke and pole pieces.

Throughout the specification and in the following claims the expression—separate pole pieces—has been frequently used. This does not mean that the pole pieces are separate from the yoke after assembly but to indicate that they have been made separately from the yoke and then assembled with the yoke.

While I have shown but two modifications of my invention, it is to be understood that these modifications are to be taken as illustrative only and not in a limiting sense. I do not wish to be limited to the specific structure shown and described but to include all equivalent variations thereof except as limited by the claims.

I claim:

1. A closed yoke multi-pole field structure having a plurality of separately formed pole pieces, comprising a series of duplicate stampings forming a closed yoke with a single notch in the inner periphery of each stamping, said stampings being assembled with the notch of alternate stampings positioned at different pole junctures so that adjacent stampings at a pole juncture will be notched and unnotched, and other series of stampings forming pole pieces with alternate stampings having a lug extending centrally from the end thereof to fit the notches of the first series.

2. A field stack and coil assembly for a multi-pole motor comprising, a closed yoke, a plurality of separately formed pole pieces, and form wound coils on each of said pole pieces, said yoke comprising a series of duplicate annular stampings having notches in their inner periphery, the number of notches for each stamping being less than the number of separately formed pole pieces, said stampings being assembled with alternate stampings having a notch positioned at one pole juncture and an unnotched portion positioned at the adjacent pole junctures, said pole pieces comprising a series of stampings with alternate stampings having a lug projecting centrally from the ends thereof to fit the notches in the yoke stampings, said pole pieces being interfitted with and secured to the yoke stampings with the lugs of the alternate pole piece stampings engaging the notches of the alternate yoke stampings.

3. A four-pole two-coil stack and coil assembly for a motor comprising, a closed yoke structure having two opposed poles integral therewith, two opposed separately formed pole pieces and a prewound coil on each separately formed pole piece, said closed yoke structure comprising a series of closed laminae, each having two integral pole extensions and a notch in its inner periphery at a single juncture for said separately formed pole pieces whereby the yoke laminae at each pole juncture will have alternate notched and unnotched portions, said laminae being assembled with the notches of alternate laminae positioned at the juncture for the opposite separately formed pole pieces, said separately formed pole pieces comprising a series of laminae with alternate laminae having a lug extending centrally from the end thereof to fit the notches of the yoke laminae, the laminae of said separately formed pole pieces being interfitted with and secured to the laminae of said yoke structure with the lugs of the alternate pole piece laminae engaging the notches of the alternate yoke laminae.

4. A four-pole, four coil stack and coil assembly for a motor comprising, a closed yoke, four separately formed pole pieces and a prewound coil on each pole piece, said yoke comprising a stack of duplicate closed laminations with but two notches in the inner periphery of each lamination, said laminations being assembled with the notches of one lamination positioned at one pair of pole junctures and the notches of the adjacent laminations positioned at the opposite pair of pole junctures, said pole pieces comprising a stack of dissimilar laminations with each alternate lamination having a portion extending centrally beyond the end thereof centrally of the body portion beyond the end of the other lamination, said pole piece lamination being assembled with the yoke laminations with the alternate extending portions of the pole piece laminations interfitting into the alternate notches in the yoke laminations and means for securing the pole pieces to the yoke.

5. In an electric motor of the type having a laminated closed yoke and a plurality of separately formed laminated pole pieces with alternate pole piece laminations having a projection extending centrally from the junction end thereof and the yoke laminations at the pole junctures having alternate notched and unnotched portions on their inner periphery, characterized in that the yoke laminations are duplicate in shape and size and the number of notches in each lamination is one-half the number of separately formed pole pieces and each alternate yoke lamination is rotated during assembly through an angle equal to 360 degrees divided by the number of separately formed pole pieces.

CLARENCE G. PUCHY.